Oct. 23, 1962 F. A. TALBOT 3,059,430
ENGINE HAVING VARIABLE COMBUSTION CHAMBER
Filed March 17, 1961 3 Sheets-Sheet 1

INVENTOR
FRANK A. TALBOT

BY

ATTORNEY

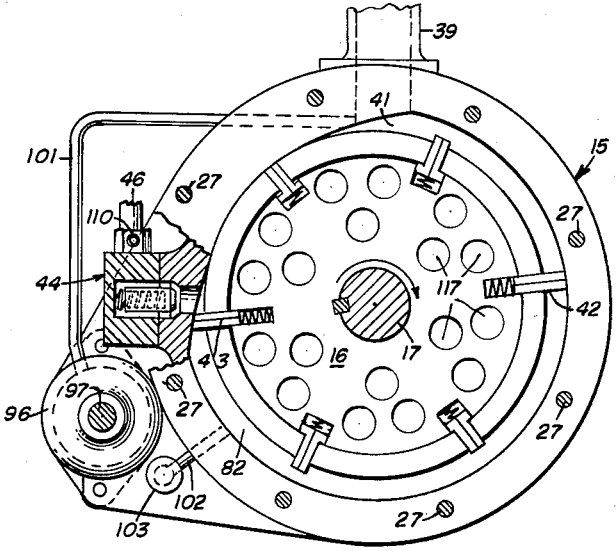
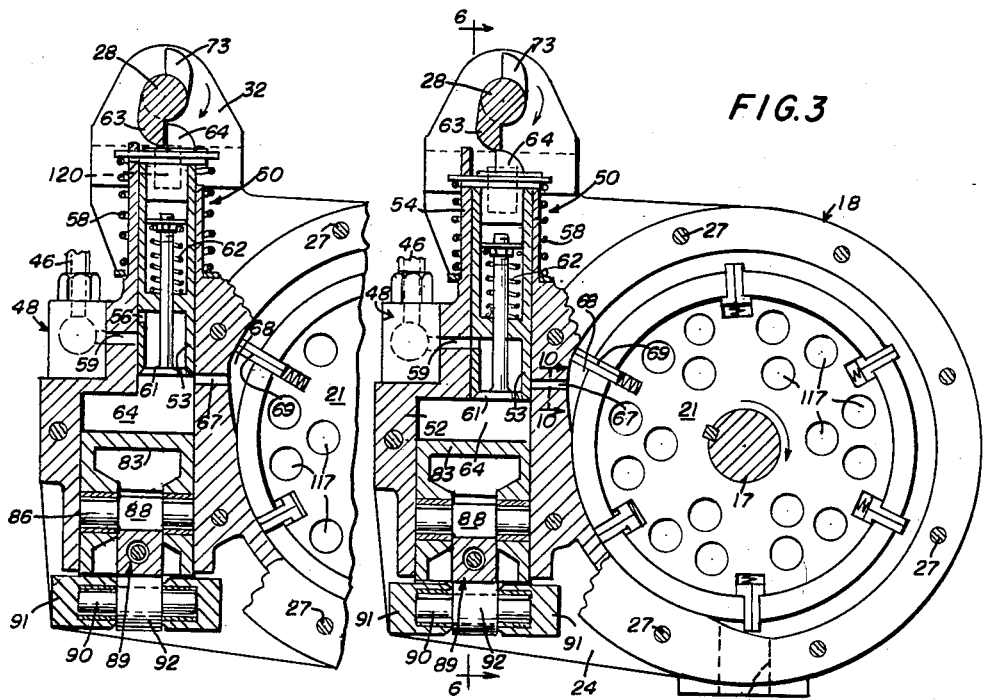

Oct. 23, 1962  F. A. TALBOT  3,059,430
ENGINE HAVING VARIABLE COMBUSTION CHAMBER
Filed March 17, 1961  3 Sheets-Sheet 3

INVENTOR
FRANK A. TALBOT
BY
ATTORNEY

United States Patent Office 3,059,430
Patented Oct. 23, 1962

3,059,430
ENGINE HAVING VARIABLE COMBUSTION CHAMBER
Frank A. Talbot, B22 Abbott Court, High St., Fairlawn, N.J.
Filed Mar. 17, 1961, Ser. No. 96,510
4 Claims. (Cl. 60—39.61)

The present invention relates to an internal combustion engine having means associated therewith for maintaining substantially uniform combustion conditions throughout a range of throttle positions and the invention more specifically pertains to a rotary type engine wherein a compressor delivers vaporized fuel under pressure into a combustion chamber which upon ignition expands into a rotary power unit which drives the shaft of the engine and the invention includes means for varying the volume of the combustion chamber in accordance with the load on the engine to maintain the designed temperature and designed compression so as to substantially completely burn all of the hydrocarbons of the fuel.

There is a continuing increase in the number of motor vehicles and their use particularly in areas where the density of population is high and has developed problems in connection with air pollution as a result of the noxious exhaust gases released from internal combustion engine of automotive vehicles. In the operation of such vehicles the load on the engine varies from idling speed to full load at recurring intervals. It is the idling and the deceleration operating conditions of an internal combustion engine which produce exhaust containing from thirty to eighty percent unburned hydrocarbons so that in areas where a large number of automotive vehicles operate in congested traffic the release of noxious gases is at a high and undesired level.

It is accordingly an object of the present invention to provide an engine of the internal combustion type for operation with existing fuels which provides for substantially complete burning of the fuel throughout the range of operating conditions of the engine to reduce to a minimum the discharge of unburned hydrocarbons or noxious exhaust gases into the atmosphere and at the same time to provide an engine of improved efficiency.

A more specific object of the invention is to provide a rotary type engine which is provided with separate combustion chamber having means associated therewith for varying the size of the combustion chamber in accordance with the position of the throttle or the load on the engine with the fuel delivered into the combustion chamber under pressure so that it is possible to maintain the designed combustion temperature so as to burn substantially all of the hydrocarbons of the fuel and to release the burning expanding gases into a rotary power unit for producing torque on the engine shaft.

In a conventional type four-cycle engine with reciprocating pistons there is some braking action during deceleration of the engine. As the throttle moves towards the closed position and on the suction stroke of a piston a negative pressure is created which constitutes braking action. When the inlet valve closes the negative pressure is trapped in the cylinder and atmospheric pressure is applied at the other side of the piston which tends to push it towards the closed end of the cylinder counteracting the braking effort. On movement of the piston away from the closed end of the cylinder during ignition a negative pressure is again created within the cylinder for about three-fourths of the stroke when the exhaust valve opens. The pressure at opposite sides of the piston then becomes equal and the braking action expires. Thus in operation of a four-cycle reciprocating piston engine there is braking effort only during approximately three-fourths of one stroke.

It is an object of the present invention to provide an internal combustion engine wherein a compressor replaces the suction and compression strokes of a conventional type four-cycle engine for delivering the fuel to the combustion chamber to thereby provide improved brake action during deceleration because there is at all times a negative pressure in the power unit when the throttle moves towards the idling position.

A further object of the invention is to provide a rotary type engine having at least two rotary power units into which the expanding burning fuel is delivered in alternating relationship to provide for an overlap of the power strokes of the rotary power units to provide an engine with a horse power rating substantially greater than that of a conventional reciprocating engine of similar size.

The other objects and features of the invention will be appreciated and become apparent particularly to those acquainted with the internal combustion engine art as the present disclosure proceeds and upon consideration of the following detailed description of an engine exhibiting the invention taken in conjunction with the accompanying drawings wherein an embodiment of the invention is disclosed.

In the drawings:

FIG. 3 is a sectional view taken on the line 3—3 of FIG. 1 showing one of the power units in end elevation.

FIG. 4 is a view taken on the line 4—4 of FIG. 1 and constituting an end elevation of the rotary compressor with the discharge valve assembly illustrated in section.

FIG. 5 is a sectional view through a combustion chamber showing the slide valve in a position permitting the expanding gases to move into the associated rotary power unit.

Figure 9:
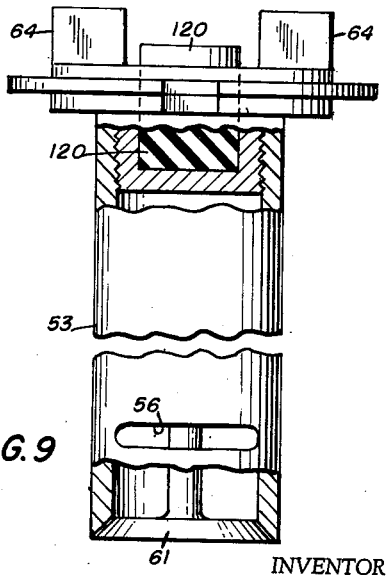

FIG. 9 in an enlarged side elevation of one of the slide valves.

Figure 10:
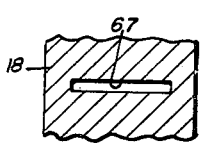

FIG. 10 is a sectional view taken on the line 10—10 of FIG. 3 showing the passage leading to the power unit.

The present invention pertains to a rotary type engine wherein a compressor replaces the suction and compression strokes of a conventional four-cycle engine. The vaporized fuel mixture is compressed and delivered into a combustion chamber. The volume of the combustion chamber is adjustable and the size is varied in accordance with changes in the throttle position or the load on the engine. The compressed fuel mixture in the combustion chamber is confined and ignited. A valve operated in timed relation to movements of the compressor and the power unit admits the expanding and burning fuel into power unit which includes a rotor. The expansion of the burning gases provides a power impulse which turns the rotor and is then released to the atmosphere. The engine is desirably provided with at least two power units and compressed fuel after ignition in a second combustion chamber is released into the second power unit for expansion before the power impulse in the first unit is spent. Thus there is an overlapping of the power impulses.

A feature of the engine embodying the invention is that the volume of the chamber in which ignition is initiated varies in accordance with the position of the throttle or the load on the engine to maintain high pressures and a high temperature in the combustion chamber at all loads below the full load so that the hydrocarbons of the fuel are completely burned to reduce to a minimum any unburned products of the hydrocarbons for release as exhaust to avoid contamination of the atmosphere.

Figure 8:
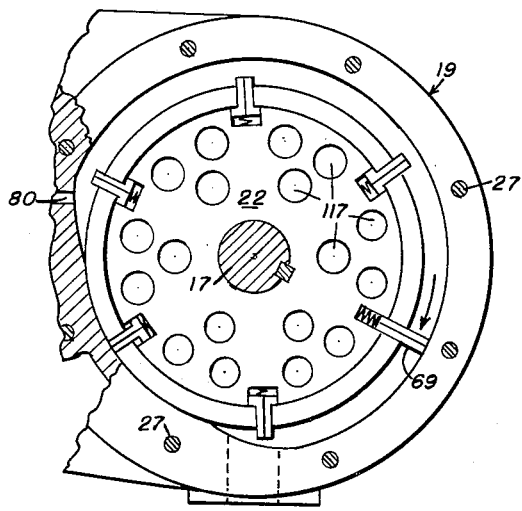
FIG. 8 is a view similar to FIG. 3 showing the other power unit in end elevation.

A compressor shown at 15 in the drawings forms a component of the engine and it is of the rotary type having a rotor 16 (FIG. 4) keyed or otherwise secured to a shaft 17. The engine drives the shaft 17 and in one embodiment two rotary power units 18 and 19 form components of the engine. The rotor 21 for the power unit 18 is shown in FIGS. 3 and 5 while the rotor for the power unit 19 is shown at 22 in FIG. 8. These rotors are each keyed to the shaft 17 so that rotor 16 of the compressor is driven and rotates in timed relationship with the rotors 21 and 22. The angular position of the rotor 22 of the power unit 19 is displaced one hundred and eighty degrees from the position of the rotor 21.

A plate 20 closes the rear end of the housing of the compressor 15. A plate 23 closes the other end of the housing of the compressor 15 and also closes the rear end of the housing of the power unit 19. A plate 24 is provided between the power units 18 and 19 and closes the adjacent ends of these housings. A plate 26 closes the forward end of the power unit 18. The compressor and the power units 19 and 18 may be maintained in rigid assembled relationship by means of tie rods or bolts 27 which extend through openings in the respective elements.

A cam shaft 28 extends transversely of the power units 18 and 19 and it may be journalled for rotation in bearings 31 and 32 supported by plates 26 and 23. A pulley 33 is keyed or otherwise secured to the cam shaft 28. A similar pulley 34 is keyed to or secured on the main shaft 17. A tooth type belt or chain 36 trained about the pulleys 33 and 34 drives the cam shaft in timed relationship with the main shaft 17. In one embodiment the cam shaft 28 is turned through one revolution for each revolution of the main shaft.

A conventional type carburetor diagrammatically represented at 38 provides a mixture of vaporized fuel and air which is admitted to the housing of the compressor 15 through a conduit 39 having a throttle valve 40 therein. The rotor 16 of the compressor is driven in a clockwise direction as viewed in FIG. 4 by the main shaft 17. A low pressure condition is developed in the area 41 trailing one long vane 42 carried by the compressor rotor to draw the fuel mixture into the compressor. The fuel mixture in advance of the vane 42 is compressed as this vane moves towards the discharge zone of the compressor. Another long vane 43 on the rotor provides structure producing two peak pulses during each revolution of the shaft 17 and these pressure pluses are delivered through the exhaust valve assembly 44 into a conduit 46 leading from the compressor. The two pressure peak are produced in timed relationship with the rotation of the rotors 21 and 22 and rotation of the cam shaft 28.

The conduit 46 extends from the outlet valve assembly 44 of the compressor to a manifold 48 which is mounted adjacent both power units 18 and 19. The compressed fuel mixture in the manifold 48 is supplied alternately to two combustion chambers during each revolution of the main shaft 17 through valves which are about to be described which are actuated by cams carried by the shaft 28 and which operates in timed relationship with rotation of the main shaft.

One of the valves is represented generally at 50 and the other valve 51 is associated with the power unit 19. These valves are of similar construction and the valve 50 includes a sleeve 53 having a cylindrical exterior mounted for axial movements in a tubular projection 54 which may form a portion of the housing of the power unit 18. The sleeve 53 has a port 56 in the wall thereof. A spring 58 urges the sleeve 53 to an upper position as shown in FIG. 5 so that the port 56 is not in registration with a passage 59 extending from the manifold 48. A stem type valve 61 is mounted for reciprocating movements in the sleeves 53 and a spring 62 biases the valve 61 to a position closing the lower end of the sleeve 53.

When the rotor 21 of the power unit 18 is in the position shown in FIG. 3 a cam 63 carried by the shaft 28 engages lugs 64 carried by the valve 51 and moves the sleeve 53 downwardly against the action of the spring 58. This movement of the sleeve 53 is in timed relationship with one of the pressure pulses developed by the compressor 15. The port 56 is thereby brought into registration with the passage 59. The fuel mixture under pressure shifts the valve 61 to an open position so that the fuel mixture moves into a chamber 64. The fuel mixture in the chamber 64 is ignited by a spark plug 66 forming an element of a conventional ignition system.

The cam 63 passes the lugs 64 so that the sleeve 53 returns to the position shown in FIG. 5 under the influence of the spring 58 and the pressure developed during expansion of the burning fuel mixture in the chamber 64. When the sleeve 53 arrives at the upper position a passage 67 is no longer obstructed whereby the burning and expanding gases move from the combustion chamber into the space 68 within the housing of the power unit 18 in back of a long vane 69 on the rotor 21. The vane 69 imparts rotational movement to the rotor 21 which continues to rotate under diminishing pressure until the vane 69 passes an exhaust port 71 for this unit when the pressure in back of the vane 69 drops to atmospheric pressure.

Figures 1, 2:
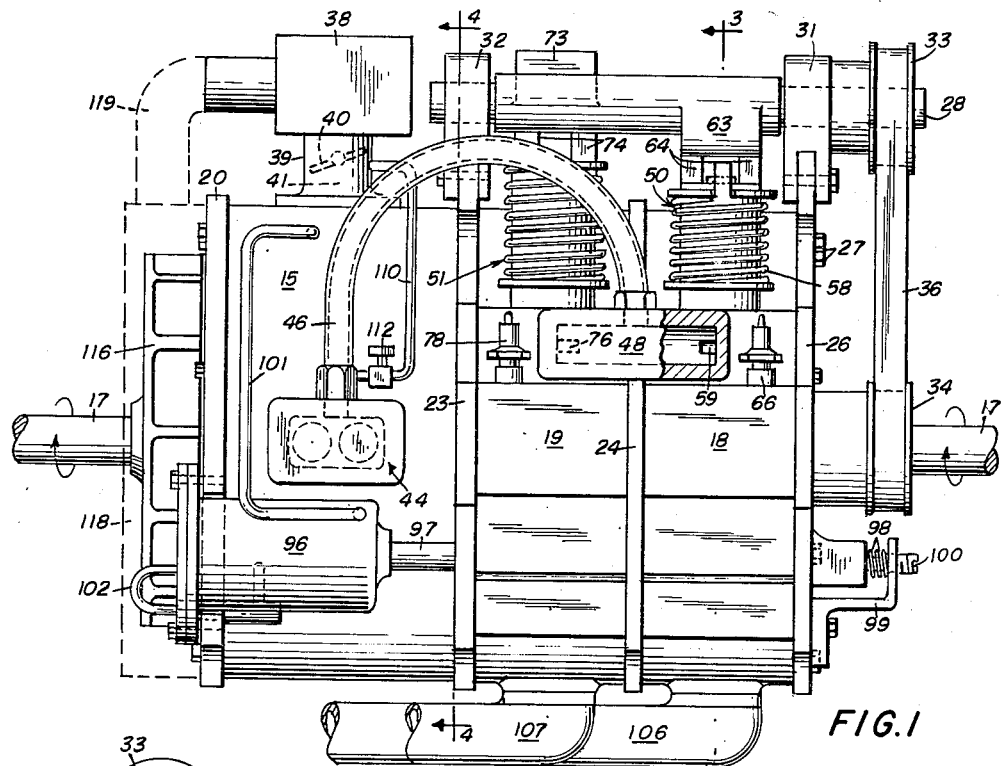
FIG. 1 is a side elevational view of an engine embodying the invention.
FIG. 2 is a front end elevational view.
Figure 6:
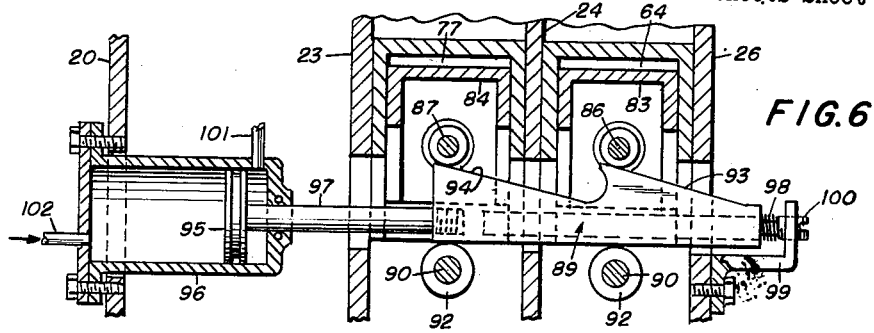
FIG. 6 is a fragmentary sectional view taken on the line 6—6 of FIG. 3 showing a mechanism for altering the volume of the combustion chambers.
Figure 7:
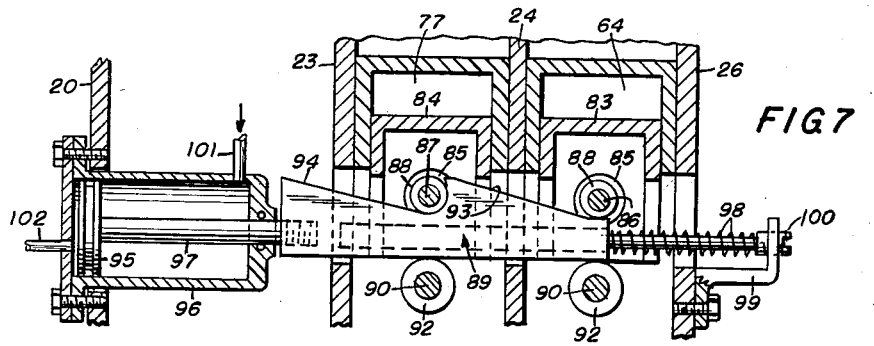
FIG. 7 is a similar view showing the position of the control mechanism at a full load position.

During such rotational movement of the shaft 17 the cam 73 engages lugs 74 on the valve 51 and moves the sleeve downwardly so that the passage 76 (FIG. 1) leading to the other combustion chamber 77 is no longer obstructed whereby another pressure pulse developed by the compressor is delivered into the combustion chamber 77 (FIGS. 6 and 7). The fuel in this combustion chamber is ignited by a spark plug 78 and then expands into the housing of the power unit 19 when the valve 51 returns to an inactive position. The expanding gases are admitted to the power unit 19 when the vane 69 of the power unit 18 has advanced approximately two hundred degrees forwardly of the position shown in FIG. 3. At this instant the long vane 69 on the rotor 22 has moved slightly beyond the passage 80. Thus there is overlap of the power strokes provided by the power units 18 and 19.

The engine may be started by rotating the main shaft 17 in any suitable or conventional manner such as by manual cranking or an electric starting mechanism. As the shaft 17 rotates the fuel mixture is drawn into the compressor housing 15 and delivered alternately into the combustion chambers 64 and 77. The fuel is ignited by the spark plugs and the engine operates to drive the shaft 17.

One of the features of the invention pertains to varying the volume of the combustion chambers 64 and 77 in accordance with the position of the throttle valve 40 or the load on the engine so as to obtain substantially complete combustion of the fuel throughout the range of operating conditions. When the engine is idling the throttle valve 40 is almost closed to provide a high negative pressure in the area 41 and a positive pressure is developed in the area 82. The means hereinafter described for altering the size of the combustion chambers responds to those two pressure zones.

The mechanism for varying the volume of the combustion chambers includes a piston 83 mounted for axial movements in the combustion chamber 64 and a piston 84 is mounted for axial movements in the combustion chamber 77. These pistons remain stationary in the respective combustion chambers but are shiftable to positions for varying the volume of the respective combustion chambers. A pin 86 extends through the piston 83 and a similar pin 87 extends through the piston 84. A roller bearing 88 is carried by the intermediate position of the pins 86 and 87. A shiftable control element 89 is supported for linear movements transversely of the pistons 83 and 84. The support includes pins 90 which extend into blocks 91 which may be secured to the plates 23, 24 and 26. A roller bearing 92 is arranged on the intermediate portion of each pin 90.

The control element 89 is provided with two inclined surfaces 93 and 94 which slope in the same direction. The control element 89 is shiftable in directions of its length by means of a piston 95 which is mounted for reciprocation in a cylinder 96. A piston rod 97 is connected to the control member 89. The control member is biased to the left in FIGS. 6 and 7 by means of a spring 98 which has one end in abutting relationship with a screw 100 which is threaded in a bracket 99 and the other end in abutting relationship with the control element 89. A conduit 101 extends from the low pressure zone 41 of the compressor 15 into communication with the cylinder 96. Another conduit 102 extends from the positive pressure area 82 of the compressor into communication with the cylinder 96 at the opposite side of the piston 95.

When the engine is operating at idling speed with the throttle valve 40 in a nearly closed position the negative pressure developed at 41 is made effective on the piston 95 through the conduit 101 and the piston 95 is pulled to the right as shown in FIG. 6. At the same time the positive pressure from the zone 82 is applied through the conduit connection 102 and a check valve 103 to the other side of the piston 95 which tends to push this piston and the piston rod 97 to the right. These two pressures cooperate to balance the downward thrust on the pistons 83 and 84 when combustion is developed in the combustion chambers 64 and 77. The inclined surfaces 93 and 94 tend to force the control member 89 to the left but the resulting force is not sufficient to shift the control member against the pressure applied to the piston 95. The combustion chambers 64 and 77 are thus maintained at a minimum volume.

As the throttle valve 41 is moved towards a full open position to handle a full load on the engine a very low negative pressure is developed at 41 and at the area 82 in the compressor the positive pressure is sufficiently high to balance the downward thrust of the full load charge applied on the inclined surfaces 93 and 94 which have shifted to the left in FIG. 7. At all intermediate throttle positions there is a balance of the forces developed by the pressures at the opposite sides of the piston 95 and the disposition of the inclined surfaces 93 and 94 to maintain the correct size of the combustion chambers to provide for complete combustion of the fuel and to avoid the discharge of unburned hydrocarbons into the atmosphere through the discharge ports and the exhaust pipes 106 and 107 leading from the power units. The spring 98 is for the purpose of adjusting the balance of the forces applied to the control element 89. The size of cylinder 96 and the characteristics of the spring 98 may be such as to shift the control element to the position shown in FIG. 7 for starting after the engine has been at rest or the spring and cylinder may be so related as to shift the control element to the position shown in FIG. 6. The tension of the spring 98 may be varied by adjusting the position of the screw 100. A conduit line 110 may be provided leading from the conduit 46 to the inlet of the compressor with an adjustable regulator valve 112 arranged therein to limit or change the pressures at which the fuel is supplied to the combustion chambers. Any excess is recirculated through the conduit 110 to the inlet of the compressor.

The bearings for the main shaft and the cam shaft may be lubricated in any suitable manner. The dissipation of heat from the engine may follow conventional practices and one arrangement for carrying heat from the engine involves a series of openings 114 in the front end plate 26 with corresponding openings (not shown) in the plates 24, 23 and 20. A fan 116 mounted on the main shaft 17 designed to draw air through the openings in the end plates and openings 117 in the rotors. A housing 118 shown in dotted lines in FIG. 1 may be provided to encase the fan and discharge the heated air through a conduit 119 to the inlet of the carburetor.

The valves 50 and 51 may each be provided with a resilient plug 120 which is mounted in any suitable manner at the upper end of the sleeve 53 so as to avoid impact noises when the valve returns to the position shown in FIG. 5.

While the invention has been shown and described in connection with specific structural features it will be appreciated that changes may be made in the components as well as the various elements. Such changes together with alterations in the overall organization and other modifications may be made without departing from the spirit and scope of the invention as set forth in the appended claims.

What I claim and desire to secure by Letters Patent is:

1. An internal combustion engine comprising, a shaft, two power units each having a vaned rotor secured to said shaft with one of said rotors angularly displaced from the other, a compressor having a rotor secured to said shaft, means providing a combustion chamber for each power unit, means guiding said fuel into said compressor, means including the rotor of the compressor providing two pressure pulses of fuel during each revolution of said shaft, a valve associated with each combustion chamber, means operated in timed relation with the rotation of said shaft for actuating said valves and alternately admitting the pressure pulses of fuel into the respective combustion chambers, a spark plug associated with each combustion chamber for igniting the fuel therein, valves operable to admit the burning fuel and expanding gases into the presence of the respective vaned rotors, a control cylinder with a piston therein, means actuated by said piston for varying the size of said combustion chambers, and means responsive to the pressures at the inlets and near the outlets of the compressor for shifting said piston.

2. An internal combustion engine comprising, a shaft, a first power unit and a second power unit each having a vaned rotor secured to said shaft with the rotor of the second power unit angularly displaced from the rotor of the first power unit by approximately one hundred eighty degrees, a compressor including a rotor secured to said shaft, means providing a first combustion chamber for the first power unit, means providing a second combustion chamber for the second power unit, a source of vaporized fuel, means guiding said fuel into said compressor, means including the compressor rotor providing two pressure pulses of fuel during each revolution of said shaft, a first valve assembly associated with the first combustion chamber, a second valve assembly associated with the second combustion chamber, cam means operated in timed relation with the rotation of said shaft for actuating the first valve assembly to admit one fuel pressure pulse into the first combustion chamber, cam means operated in timed relation with the rotation of said shaft actuating the second valve assembly to admit the second fuel pressure pulse into the second combustion chamber, a spark plug associated with each combustion chamber for igniting the fuel therein, said valve assemblies being operable to admit the burning fuel and expanding gases from the first combustion chamber into the first power unit and the burning and expanding gases from the second combustion chamber into the second power unit, a control cylinder with a piston therein, cam means actuated by the position of said piston for varying the size of said combustion chambers, and means responsive to the pressures at the inlet and near the outlet of the compressor for shifting said piston.

3. An internal combustion engine comprising, a shaft, a fuel supply, a power unit including a rotor secured to said shaft and rotatable by gas under pressure, a compressor driven by said shaft, means guiding fuel from said supply to the compressor wherein a fuel pressure pulse is developed, means providing a combustion chamber, means operable in timed relation to the rotation of said shaft delivering said fuel pressure pulse into said combustion chamber, means for igniting the fuel in said combustion chamber, means operable in timed relation to the rotation of said shaft for delivering the expanding gases into the presence of said rotor, and means varying the volume of said combustion chamber in response to a differential of pressures at the inlet and near the outlet of the compressor.

4. An internal combustion engine comprising, a shaft, a fuel supply, a power unit including a rotor secured to said shaft and rotatable by gas under pressure, a compressor driven by said shaft, means guiding fuel from said supply to the compressor wherein a fuel pressure pulse is developed, means providing a combustion chamber, means operable in timed relation to the rotation of said shaft delivering said fuel pressure pulse into said combustion chamber, means for igniting the fuel in said combustion chamber, means operable in timed relation to the rotation of said shaft for delivering the expanding gases into the presence of said rotor, and means responsive to the pressure adjacent the outlet of said compressor for varying the volume of said combustion chamber.

References Cited in the file of this patent

UNITED STATES PATENTS

| | | |
|---|---|---|
| 753,086 | Mains | Feb. 23, 1904 |
| 1,812,572 | Talbot | June 30, 1931 |
| 2,379,838 | Stanzel | July 3, 1945 |
| 2,511,441 | Loubiere | June 13, 1950 |

FOREIGN PATENTS

| | | |
|---|---|---|
| 1,205,388 | France | Aug. 17, 1959 |